Jan. 4, 1966 J. T. McNANEY 3,228,029

FACSIMILE DATA RECORDING APPARATUS

Filed Feb. 20, 1962

INVENTOR.

Joseph T. McNaney

United States Patent Office 3,228,029

Patented Jan. 4, 1966

3,228,029

FACSIMILE DATA RECORDING APPARATUS

Joseph T. McNaney, 8548 Boulder Drive, La Mesa, Calif.

Filed Feb. 20, 1962, Ser. No. 174,531
4 Claims. (Cl. 346—74)

This invention relates to an improvement in facsimile data recording apparatus which is designed to provide an electrostatic latent image facsimile of data appearing on a sheet of data being in the form of a typewritten document, manuscript, drawing or the like. The invention relates more particularly, however, to an improvement in facsimile recorders utilizing electrostatic latent image development techniques wherein a facsimile of a typewritten document, for example, is developed on the surface of a data receiving medium in the form of a latent image comprised of development-powder-repelling forces in combination with development-powder-attracting forces.

This invention, therefore, is designed to supplement by improvement in data copying systems described in my U.S. patent application, Serial No. 153,378, filed November 20, 1961, entitled Data Copying System.

It is an object of the present invention to provide simultaneously with the scanning of a modulated light source and the scanning of a data receiving medium, a uniform development-powder-attracting electrostatic polarity on the surface of the data receiving medium followed by the establishment of development-powder-repelling electrostatic forces in response to light being received by the scanning means.

It is, therefore, an object of this invention to provide a more effective electrostatic image producing means in a process of making a positive copy of a positive original.

It is also an object of this invention to provide a novel electrostatic image polarizing device for use in a data copying system for making a positive facsimile of data appearing on a sheet of data, such as this page of the present specification.

Further objects and a more complete understanding of the invention will become apparent with reference to the following description and claims, when read in conjunction with the accompanying drawing in which:

Figures 1, 2, 3:
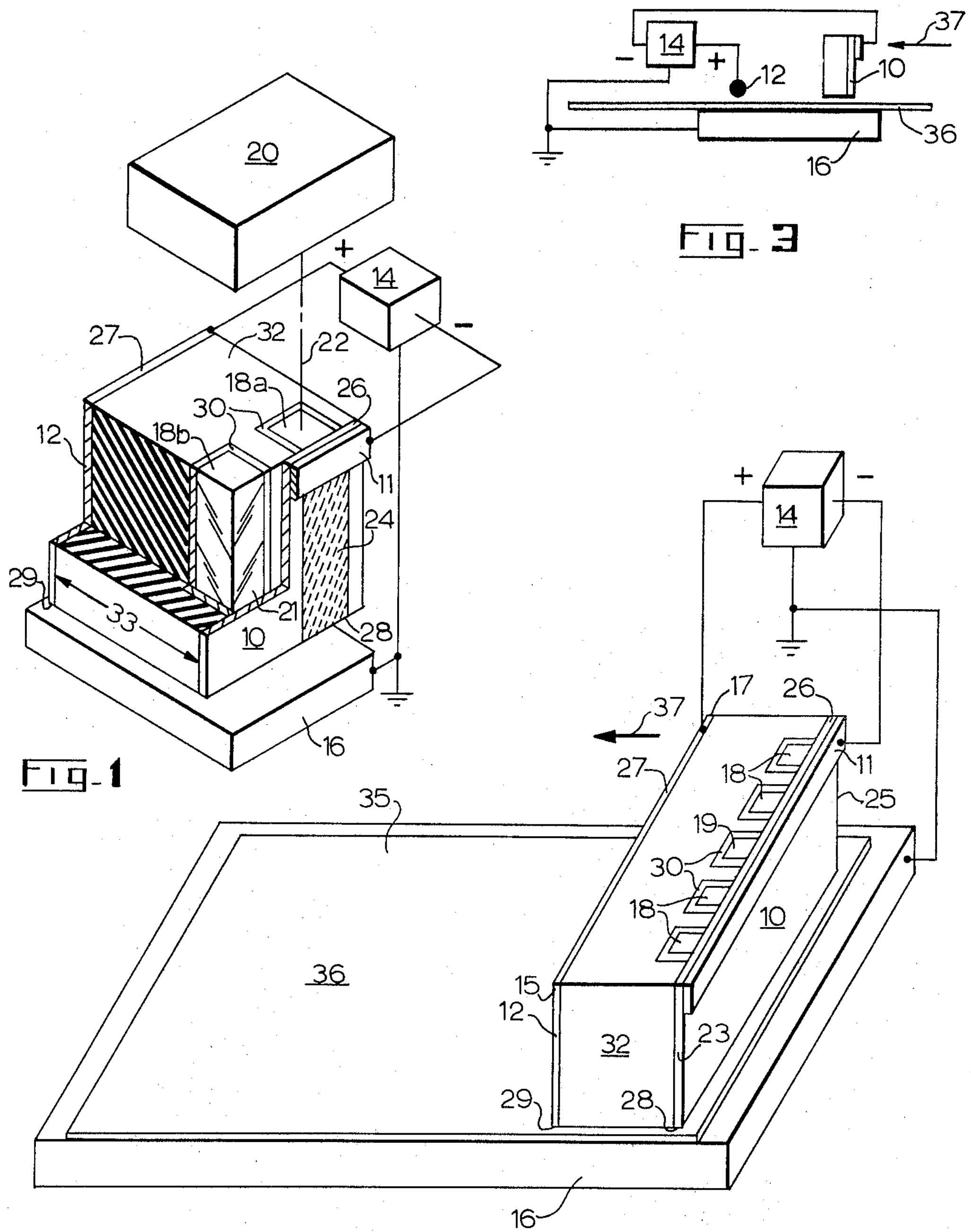
FIGURE 1 is a three dimensional view of a partially sectional portion of the image polarizing device of the invention for the purpose of illustrating certain structural aspects of the device and describing its operation in combination with a source of modulated light information.
FIGURE 2 is a three dimensional view of a more complete illustration of the record medium polarizing system.
FIGURE 3 is a diagrammatic presentation of the embodiment shown in FIGURE 2.

Referring now to FIGURE 1, the electrostatic record medium polarizing device of this invention includes the use of a pair of electrostatic flux generators, namely, one being a layer of photoconductive material 10, and the other being a layer of electrically conductive material 12, connected, respectively, to opposite polarities of a voltage source 14, in relation to an electrode 16 which is connected to a neutral polarity of the voltage source 14. The electrostatic flux generator in the form of a conductive layer 12 is connected, for example, to a positive polarity of the voltage source 14 and, therefore, designed to discharge positively charged ions in the direction of the electrode 16. The electrostatic flux generator in the form of a photoconductive layer 10 is connected to the negative polarity of the voltage source 14 and, therefore, designed to discharge negatively charged ions in the direction of the electrode 16. However, the photoconductive layer 10 is designed to discharge negatively charged ions under the control of light being directed to predetermined surface areas thereof.

Light is directed to predetermined areas of the photoconductive layer 10 by means of light conducting optical fibers 18 which receive light from a modulated light source 20. For example, the optical fiber 18*a* is exemplified as receiving light along an optical path 22, which light is then directed to the predetermined area 24 which is illustratively crosshatched. When illuminated in such a manner, the crosshatched area will be a conductor of electrical current from a first end 26 to a second end 28 of the layer 10, while the remaining area thereof functions as a resistor to the flow of electrical current. The illuminated area 24, therefore, will discharge negatively charged ions in the direction of the electrode 16, from the second end 28 thereof.

The optical fibers 18 are extremely efficient conductors of light by virtue of a light reflecting jacket 30 cladding all but a predetermined surface area along the horizontal dimension of the fibers 18. These optical fibers 18 are made of a light conducting glass, lucite or the like, having a predetermined index of refraction and a longitudinal dimension which exceeds its cross sectional dimension many times. The light reflecting jacket 30 is made of a light conducting material such as glass, or the like, having an index of refraction less than the predetermined index of the fibers 18. The jacket material 30 is intimately joined to the fibers 18 forming a smooth interface at and along the juncture. The photoconductive layer 10 is also intimately joined to the fiber 18 along the unclad longitudinal dimension thereof. The layer 10 may be selected from among certain photoconductive materials such as selenium, cadmium sulphide, and like materials.

A bonding material, such as glass, plastic, hard rubber or like materials, is used as a support 32 for the purpose of holding and thereby supporting in their respective positions, the optical fibers 18 and thereby the photoconductive layer 10, and, the layer of electrically conductive material 12. The latter is made to assume a position in relation to the photoconductive layer 10 whereby the second end 28 of the layer 10 and a second end 29 of the layer 12 will be electrically isolated from one another and positioned on a common electrostatic flux radiation plane. The ends, 28 and 29, are so isolated by virtue of a thickness dimension 33 given the support 32, in addition to the support being an electrical insulator. The primary object of isolating the ends, 28 and 29, from one another is to avoid a transfer of ions therebetween, since these ends, 28 and 29, are designed to radiate ions, respectively, in the direction of the electrode 16.

When in operation, the conversion of predetermined longitudinally dimensioned areas of the photoconductive layer 10 from a non-conductor to a conductor of electrical energy will be accomplished by illuminating these areas with light waves being reflected from the jacket 30 beyond the interface of the fiber 18 and the jacket 30. The efficient conduction of light waves through the fibers 18 for the purpose of making electrically conductive predetermined areas of the layer 10 depends, however, upon the light reflecting capabilities of the jacket 30 which, in turn, depends upon the index of refraction of the jacket material in relation to the index of refraction of the fiber material. The optical fibers 18 of this invention, therefore, each have a predetermined index of refraction and the light conducting jacket 30 has an index of refraction less than the predetermined index of the fibers 18. The objects of this invention will be accomplished very efficiently through the use of fibers 18 having diameters of less than 0.001" and of lengths in excess of several tenths of an inch. In view of this, the lower index material of the jacket 30 will be utilized by permitting light waves entering one end of the fiber 18 to be conducted by internal reflections to the opposite end, which reflections occur after the light waves have penetrated the jacket 30 beyond the interface separating the fibers 18 and their respective jackets 30. Due to a spiralling and scattering of the reflected light waves, the required percentage of the total amount of light entering a given fiber 18 will be permitted to reach an adjoining layer of photoconductive material 10, and thereby illuminate a given area along the longitudinal dimension thereof.

Since it is possible for optical fibers 18 of the type to which I am referring to be drawn down to diameters of less than 0.001″, it should be understood that the fibers 18 have been shown greatly enlarged in the drawing, for the purpose of assisting me in my description of the invention. Although I have chosen to show fibers 18 as being rectangular in cross section, it will of course be understood that the fiber cross sections may be round, oval, or of any other desired shape.

Referring now to FIGURE 2, a more complete illustration of the invention is shown, and in FIGURE 3 it is shown schematically. The electrostatic record medium polarizing device is shown to consist of a plurality of optical fibers 18, which have a predetermined index of refraction, clad in a light conducting jacket 30, having an index of refraction less than the predetermined index of the fiber 18, bonded together by means of the electrically resistant material 32 in a single line side-by-side relationship. The light responsive electrostatic flux generator, designed to discharge negatively charged ions, consists of a layer of photoconductive material having first and second ends, 26 and 28, first and second edges, 23 and 25, and a predetermined longitudinal dimension intermediate the first end 26 and the second end 28, extending from the first edge 23 to the second edge 25. This layer 10 is disposed upon and intimately joined to the unclad surfaces 21 of the fibers 18 for the purpose of providing a plurality of independently light controllable longitudinally dimensioned layers of photoconductive material, as described above in connection with FIGURE 1.

The electrically conductive electrostatic flux generator 12, which is designed to discharge positively charged ions, consists of a layer of electrically conductive material 12 having first and second ends, 27 and 29, first and second edges, 15 and 17, and being supported by the electrically resistant material 32. As described above in connection with FIGURE 1, the ends, 28 and 29, of the respective layers 10 and 12, are isolated electrically from each other by reason of the thickness dimension 33 of the support 32.

A sheet 36, or data receiving medium, is supported by the electrode 16 immediately below the ends, 28 and 29, of the layers 10 and 12, respectively, which are made to assume a common electrostatic flux radiation plane closely adjacent the surface 35 of the sheet 36. When the sheet 36 is positioned on the electrode 16 for the purpose of establishing an electrostatic latent image thereon, the electrostatic polarizing device of this invention is moved in the direction of arrow 37. The positive potential being connected to the layer 12 from the voltage source 14, and the negative potential being connected to the layer 10, by means of an electrical terminal 11 which is operatively connected to the layer 10, from the voltage source 14, in combination with the neutral potential being connected to the electrode 16, complete my novel electrostatic record medium 36 polarizing system. Movement of the polarizing device in the direction of arrow 37 will allow the medium 36 to be scanned, simultaneously, by a radiator of, first, positively charged ions and, second, negatively charged ions. The radiation of positively charged ions from the layer 12 establishes a uniform development-powder-attracting electrostatic polarity on the surface 35 of the medium 36, and the light controlled radiation of negatively charged ions from the layer 10 establishes selected areas of a development-powder-repelling electrostatic polarity on the surface 35 of the medium 36. If, for example, the light background on this page of printed matter represented a surface of negatively charged ions, and the dark print represented surface areas of positively charged ions, the positively charged ions within the dark areas would be the only ions remaining from an initial uniform development-powder-attracting polarity after the light background area had been subjected to the light information controlled discharge of negative ions. Hence, the positively charged ions within the dark areas will attract negatively charged powder particles while the negatively charged ions within the light background area repels the negatively charged powder particles.

The present invention, when used in combination with my data copying system improvement described in my U.S. patent application, No. 153,378, entitled Data Copying System, this more effective electrostatic image producing means of the present invention will heighten the contrast between light and dark areas of the facsimile of an original copy of printed matter.

Although I have shown and described but one embodiment of my facsimile data recording apparatus it should, of course, be understood that many other embodiments embracing the general principles and construction set forth in this application may be utilized and still be within the ambit of the present invention.

The particular embodiment of this invention illustrated and described herein is illustrative only, and the the invention includes such other modifications and equivalents as may be readily noted by those skilled in the arts, and within the scope of the appended claims.

I claim:

1. A light sensitive electrostatic voltage polarity reversing means for utilization in combination with a record medium comprising:

(a) first, second and third electrodes providing a first air gap between said first and third electrodes, a second air gap between said second and third electrodes, and a third air gap between said first and second electrodes;

(b) said first electrode being a photoconductor;

(c) means for connecting the influence of a first voltage polarity between said first and third electrodes and means for connecting the influence of a second voltage polarity, opposing said first voltage polarity, between said second and third electrodes;

(d) means for electrically insulating said first electrode from said second electrode and preventing a transfer of ions across said third air gap;

(e) said second and third electrodes being adapted to provide a transfer of ions across said second air gap under the influence of said second voltage polarity; and (f) optical fiber means for conducting light to said first electrode and thereby providing a transfer of ions across said first air gap under the influence of said first voltage polarity.

2. A light sensitive electrostatic voltage polarity reversing means for utilization in combination with a record medium comprising:

(a) first, second and third electrodes closely spaced one in relation to the other;

(b) said first electrode being a photoconductor;

(c) means for connecting the influence of a first voltage polarity between said first and third electrodes and means for connecting the influence of a second voltage polarity, opposing said first voltage polarity, between said second and third electrodes;

(d) means for electrically insulating and spacing said first electrode from said second electrode sufficiently to avoid a transfer of ions therebetween;

(e) said closely spaced first and third electrodes, and second and third electrodes, defining, respectively, first and second air gaps therebetween; and (f) optical fiber means for conducting light to said first electrode and thereby controlling and extending the influence of said first voltage polarity across said first air gap, said first voltage polarity being extended across said first air gap simultaneously with the extending of said second voltage polarity across said second air gap.

3. A light sensitive electrostatic voltage polarity reversing means for utilization in combination with a record medium comprising:

(a) first, second and third electrodes providing a first air gap between said first and third electrodes, a second air gap between said second and third electrodes, and a third air gap between said first and second electrodes;

(b) said record medium being disposed adjacent said third air gap and within said first and second air gaps;

(c) said first electrode being a photoconductor;

(d) means for connecting the influence of a first voltage polarity between said first and third electrodes and means for connecting the influence of a second voltage polarity, opposing said first voltage polarity, between said second and third electrodes;

(e) means for electrically insulating said first electrode from said second electrode and preventing a transfer of ions across said third air gap;

(f) said second and third electrodes being adapted to provide a transfer of ions across said second air gap under the influence of said second voltage polarity and deposit on said record medium a predetermined electrostatic charge; and (g) optical fiber means for conducting light to said first electrode and thereby providing a transfer of ions across said first air gap under the influence of said voltage polarity thereby producing on said record medium an electrostatic charge opposing said predetermined electrostatic charge.

4. A light sensitive electrostatic voltage polarity reversing means for utilization in combination with a record medium comprising:

(a) first, second and third electrodes closely spaced one in relation to the other;

(b) said first electrode being a photoconductor;

(c) means for connecting the influence of a first voltage polarity between said first and third electrodes and means for connecting the influence of a second voltage polarity, opposing said first voltage polarity, between said second and third electrodes;

(d) means for electrically insulating and spacing said first electrode from said second electrode sufficiently to avoid a transfer of ions therebetween;

(e) said closely spaced first and third electrodes, and second and third electrodes, defining, respectively, first and second air gaps therebetween;

(f) said record medium being disposed adjacent said first and second electrodes and within said first and second air gaps; and (g) optical fiber means for conducting light to said first electrode and extending the influence of said first voltage polarity across said record medium, said first voltage polarity being extended across said record medium simultaneously with the extending of said second voltage polarity across said record medium.

References Cited by the Examiner

UNITED STATES PATENTS

| | | | |
|---|---|---|---|
| 2,925,310 | 2/1960 | Perkins | 346—74 |
| 3,050,623 | 8/1962 | McNaney | 346—74 |

OTHER REFERENCES

Dessauer, Jr., G. R. Mott, and H. Bogdonoff, Zerography Today in Photographic Engineering, pp. 250–253, Apr. 26, 1954.

IRVING L. SRAGOW, *Primary Examiner.*